United States Patent [19]

Kameda

[11] Patent Number: 4,715,166
[45] Date of Patent: Dec. 29, 1987

[54] FILM PACKAGING APPARATUS

[75] Inventor: Hiroshi Kameda, Sakai, Japan

[73] Assignee: Tokiwa Kogyo Co., Ltd., Osaka, Japan

[21] Appl. No.: 1,194

[22] Filed: Jan. 7, 1987

[51] Int. Cl.$^4$ .................. B65B 9/06; B65B 51/14; B65B 51/16; B65B 51/26
[52] U.S. Cl. ........................... 53/550; 53/372; 53/373
[58] Field of Search ............... 53/550, 552, 372, 373, 53/450; 83/175, 176, 444, 448

[56] References Cited

U.S. PATENT DOCUMENTS

| | | | |
|---|---|---|---|
| 2,882,662 | 4/1959 | Campbell | 53/550 |
| 2,987,107 | 6/1961 | Sylvester et al. | 53/372 |
| 3,057,129 | 10/1962 | Meissner | 53/550 X |
| 3,170,354 | 2/1965 | Scholl | 83/448 X |
| 3,538,676 | 11/1970 | Runo et al. | 53/552 |
| 3,553,933 | 1/1971 | Seko | 53/550 |
| 3,850,780 | 11/1974 | Crawford et al. | 53/550 X |
| 4,115,182 | 9/1978 | Wildmoser | 53/373 X |
| 4,260,447 | 4/1981 | Muscariello | 53/372 X |
| 4,288,967 | 9/1981 | Seko et al. | 53/550 X |
| 4,512,138 | 4/1985 | Greenawalt | 53/373 X |

FOREIGN PATENT DOCUMENTS 57-13401 1/1982 Japan.
61-26037 8/1986 Japan.

Primary Examiner—Horace M. Culver
Attorney, Agent, or Firm—Birch, Stewart, Kolasch & Birch

[57] ABSTRACT

A film packaging apparatus comprising a tube former for forming a continuous length of a heat-meltable, heat-shrinkable film into a tube of such film with its longitudinal margins overlapping each other and extending downward through a bottom longitudinal outlet of the former, a longitudinal sealer disposed below the former for longitudinally heat-sealing and cutting the overlapping film margins, a transverse sealer disposed behind the former for transversely heat-sealing and cutting the film tube, wherein the longitudinal sealer comprises a cutter disc having a rounded circumferential edge and a counter disc having a flat circumferential surface in contact with the rounded edge at a position slightly deviating toward the cutter disc from a center line of the longitudinal outlet, and a longitudinal guide plate disposed immediately under the position of contact between the two discs.

9 Claims, 11 Drawing Figures

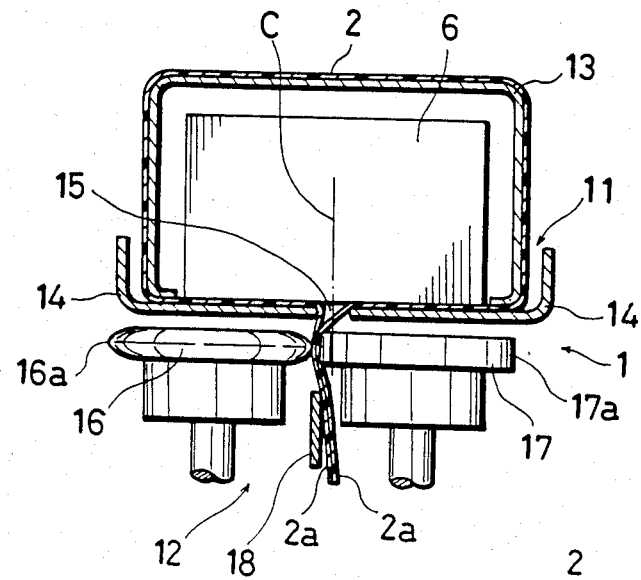
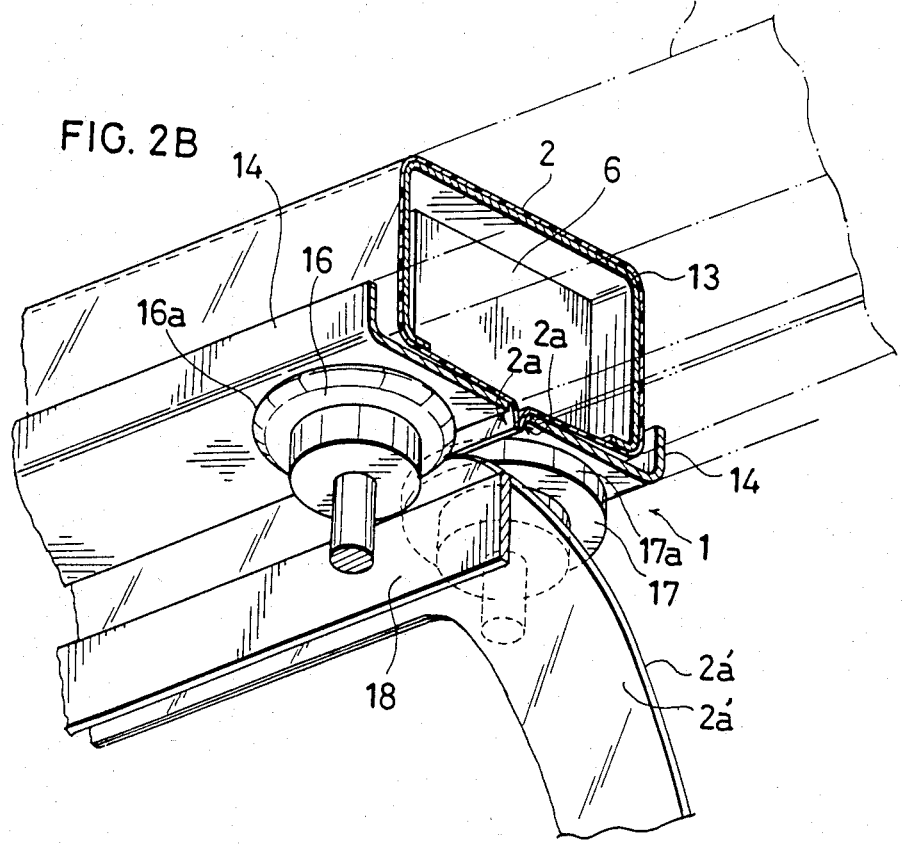

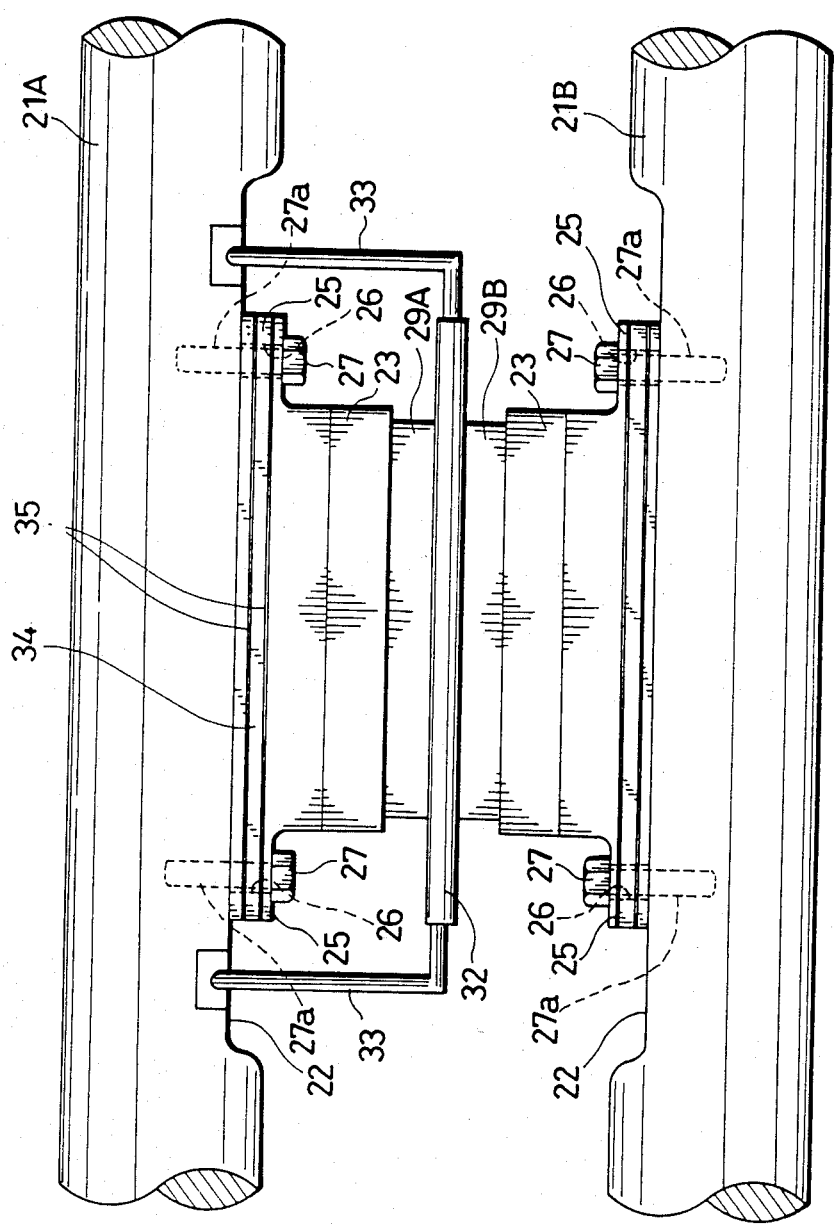

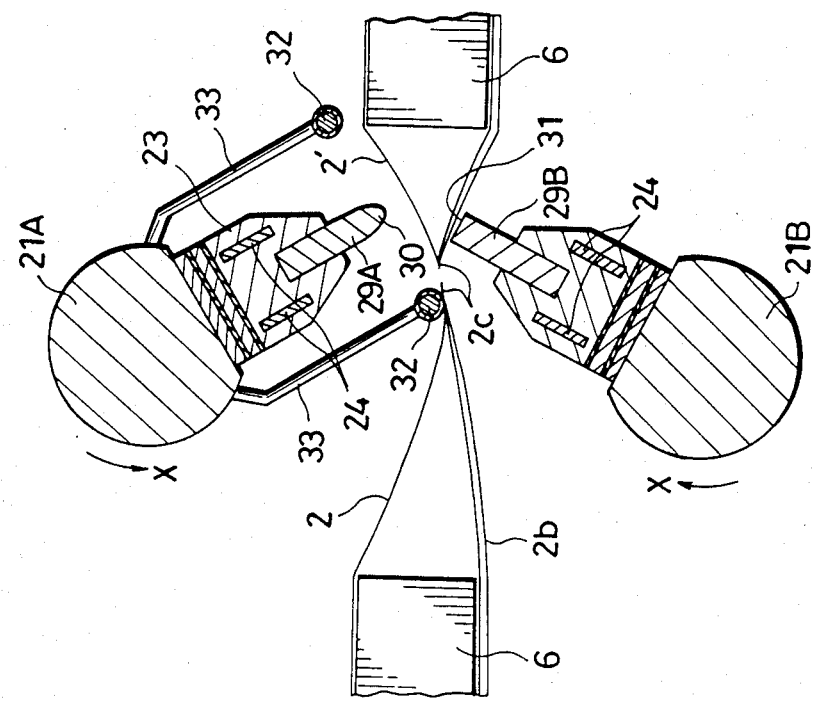
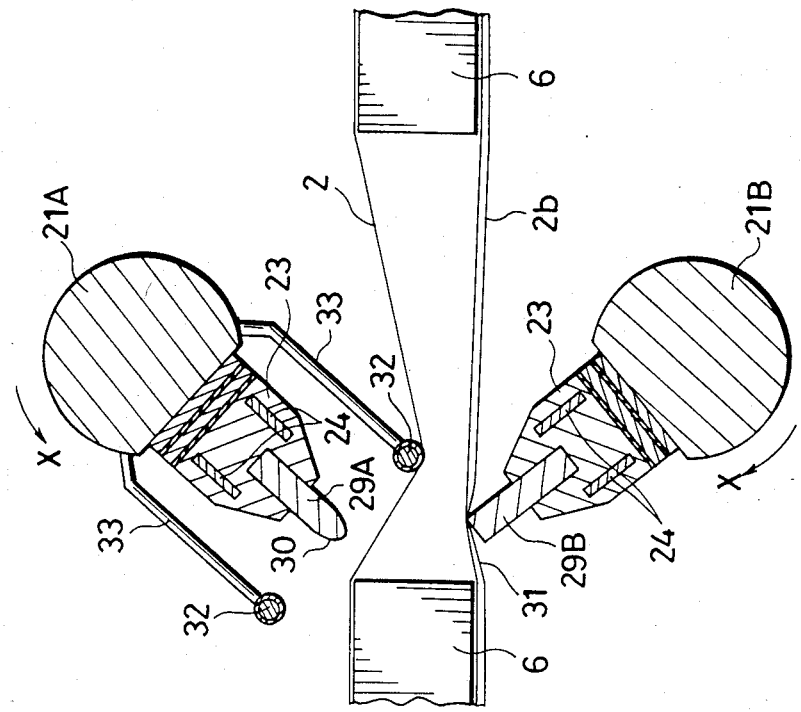

FILM PACKAGING APPARATUS

BACKGROUND OF THE INVENTION

1. Field of the Invention

This invention relates to a packaging apparatus for packaging each of successively supplied articles in a bag of a heat-meltable, heat-shrinkable film, and more particularly to an improved packaging apparatus capable of providing a packaged article which is excellent in appearance and thus high in commercial value.

Throughout the specification, the term "tube (or tubular)" is used to refer to an elongate hollow body or column which may be optional (circular, oval, rectangular, etc.) in cross section. The term "tube" is also used as a verb meaning an act of forming a film or sheet into a tubular shape.

2. Description of the Prior Art

In packaging each of successively supplied articles by an enclosure made of a heat-meltable, heat-shrinkable film, it is a common practice to first form a continuous length of such film into a tube surrounding the article with both longitudinal margins of the film heat-sealed together. Then, the film tube thus formed is transversely heat-sealed and cut at two positions slightly ahead of and behind the article to provide a film bag completely enclosing the article. Finally, the film bag is subjected to hot air treatment, whereby the film bag comes into contact with the article inside.

An apparatus usable for the above packaging operation is disclosed for example in Japanese Utility Model Application Laid-open No. 57-13401 (Laid-open: Jan. 23, 1982; Application No.: 55-91204; Filed: June 28, 1980; Applicant: Kabushiki Kaisha Fuji Kikai Seisakusho; Inventor: Mamoru Ichikawa).

The packaging apparatus according to the above laid-open application incorporates a longitudinal sealer comprising a pair of heated discs each having a flat circumferential surface. A certain width of overlapping longitudinal margins of a tubed film are nipped between the circumferential surfaces of the heated discs and heat-sealed together.

The packaging apparatus of the above laid-open application further incorporates a transverse sealer which comprises a pair of synchronously rotated rotary shafts arranged behind the longitudinal sealer and extending transversely of the tubed film respectively thereabove and therebelow, and a pair of heated sealer bodies respectively mounted on the pair of rotary shafts. Each sealer body has an arcuate sealing surface which comes into contact with a certain width (corresponding to the circumferential length of the arcuate contact surface) of the tubed film for transverse heat-sealing thereof upon every single turn of the respective rotary shafts. One of the sealer bodies is provided with a central cutter blade having a sharp cutting edge projecting beyond the arcuate sealing surface, so that the tubed film is transversely cut at the center of each transversely sealed portion of the tubed film to provide a film bag completely enclosing each article.

It is obvious from the foregoing description that the film bag provided by the packaging apparatus of the above laid-open application inevitably has relatively wide sealed portions (both longitudinal and transverse) which constitute unacceptable projections on the final product upon subsequent shrinkage of the film bag. In addition to being detrimental in appearance and handling of the product, such projections can sometimes hide informative printings on the article inside the film bag and thereby reduces the commercial value of the product.

Japanese Utility Model Publication No. 61-26037 (Published: Aug. 5, 1986; Application No.: 55-61070; Filed: May 2, 1980; Applicant: Tokiwa Kogyo Co. Ltd.; Inventor: Yoichiro Kimoto) discloses another type of transverse sealer which comprises a pair of synchronously rotated rotary shafts extending transversely of a tubed film respectively thereabove and therebelow, a pair of heated sealer bodies respectively mounted to the pair of rotary shafts, a cutter blade mounted to one of the sealer bodies and having a rounded cutting edge, a counter blade having a flat contact surface, and a pair of presser rods respectively disposed ahead of and behind the cutter blade. The rounded cutting edge of the cutter blade substantially comes into line contact with the flat contact surface of the counter blade upon every single turn of the respective rotary shafts to transversely heat-seal the tubed film interposed between the two blades. The presser rods press and tension the tubed film when the film is heat-sealed, so that the tubed film is cut at the rounded cutting edge which itself provides no cutting function without tensioning of the film because of its roundness.

Each transverse seal portion or line obtained by such transverse sealer is extremely narrow and thus almost negligible in appearance of the final product.

This laid-open Japanese application, however, fails to disclose a longitudinal sealer which is capable of forming a narrow longitudinal seal line.

SUMMARY OF THE INVENTION

It is, therefore, an object of the present invention to provide a film packaging apparatus incorporating a longitudinal sealer which is capable of longitudinally heat-sealing longitudinal edges of a tubed continuous film with an extremely narrow seal line to provide a final packaged product excellent in appearance and high in commercial value.

Another object of the invention is to provide a film packaging apparatus further incorporating a transverse sealer which is capable of transversely heat-sealing the tubed continuous film with an extremely narrow seal line.

A further object of the invention is to ensure both longitudinal and transverse heat-sealing in uniform and stable fashion.

According to the present invention, there is provided a film packaging apparatus comprising a tube former to which is supplied a continuous length of a heat-meltable, heat-shrinkable film having a pair of longitudinal margins and to which is also supplied a plurality of articles to be packaged; the former including an inner former member on which said film is wrapped with the margins overlapping each other; the former further including an outer former member having a longitudinal outlet through which the overlapping margins project out; a longitudinal sealer disposed outside the tube former adjacent to the outlet for longitudinally heat-sealing and cutting the overlapping margins; the sealer including a cutter disc having a rounded circumferential edge, and a counter disc having a flat circumferential surface substantially in contact with the circumferential edge; the margins being nipped between the cutter disc and the counter disc at a position slightly deviating toward the cutter disc from a center line of the longitudinal outlet; a film guide for directing toward the center line portions of the margins located farther from the tube former than the position of nipping; and a transverse sealer disposed behind the longitudinal sealer for transversely heat-sealing and cutting a continuous tube of the film at a position between each adjacent two of the articles to provide a bag of the film completely enclosing each of the articles.

Other objects, features and advantages of the invention will become apparent from the following detailed description given with reference to the accompanying drawings.

BRIEF DESCRIPTION OF THE DRAWINGS

FIG. 2A is an enlarged section taken on lines II—II in FIG. 1 to illustrate a longitudinal sealer;

FIG. 2B is a perspective view in section similar to FIG. 2A;

FIG. 4 is an elevation of the transverse sealer as viewed in the direction of arrows IV—IV in FIG. 3;

FIG. 5 is a side view showing the transverse sealer in a state immediately before transverse heat-sealing;

FIG. 6 is also a side view showing the transverse sealer in a state immediately after transverse heat-sealing;

DETAILED DESCRIPTION OF THE PREFERRED EMBODIMENTS

Figure 1:
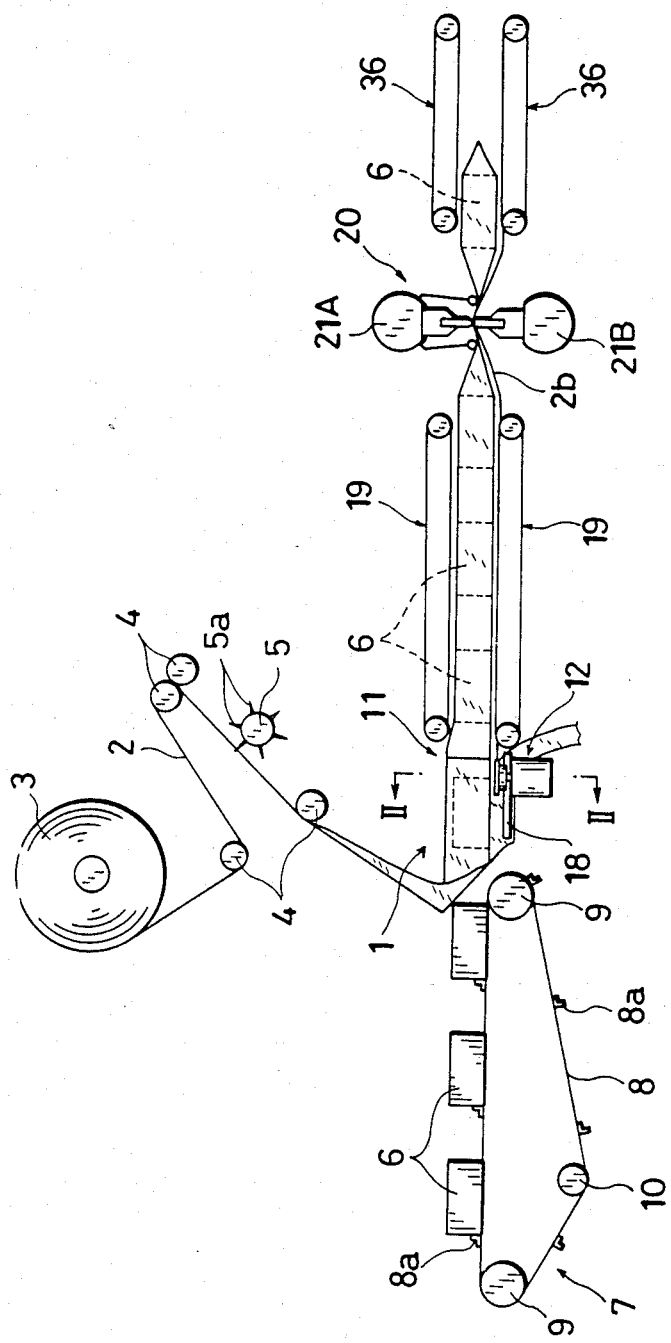
FIG. 1 is a schematic overall side view of a film packaging apparatus embodying the invention.

Referring now to the accompanying drawings, a packaging apparatus schematically illustrated in FIG. 1 comprises a film tubing device 1 to which is supplied a continuous length of a heat-meltable, heat-shrinkable synthetic resin film 2 paid out from a roll 3 of such film as guided by a plurality of guide rollers 4. On the way of its transfer to the film tubing device 1, the film 2 is formed with a multiplicity of minute pores H (see FIGS. 7 and 8) by means of a perforating roller 5 having a plurality of piercing needles 5a on the outer circumference thereof. The purpose of the pores H will be described hereinafter.

A plurality of articles 6 to be packaged are also supplied successively to the film tubing device 1 by a belt conveyor 7 which includes an endless belt 8 having engaging projections 8a. The conveyor 7 further includes a pair of main rollers 9 and a guide roller 10. An unillustrated drive mechanism drives one or both of the main rollers 9.

The film tubing device 1 comprises a tube former 11 for forming the film 2 into a tubular shape, and a longitudinal sealer 12 disposed immediately below the former 11.

As illustrated in FIGS. 2A and 2B, the tube former 11 has an inner former member which is in the form of a channel member 13 with its open side directed downward according to this particular example. The film 2 is wrapped around the inner former member 13 with its longitudinal margins 2a overlapping each other while it passes through the former 11.

The tube former 11 further has an outer former member which, according to the illustrated example, is in the form of a pair of angle plates 14 arranged to cover the lower open side of the inner former member 13. The pair of angle plates 14 are slightly spaced from each other to define a longitudinal outlet 15 for allowing the longitudinal margins 2a of the film 2 to project downward therethrough.

The structure of the tube former 11 described above is well known per se in the art and may be modified variously according to the state of art. For example, a center line C of the longitudinal outlet 15, which is illustrated in FIG. 2 as being positioned at the center of the tube former 11, may slightly deviate from the center of the tube former 11.

The longitudinal sealer 12 comprises a cutter disc 16 having a rounded circumferential edge 16a, and a counter disc 17 having a flat circumferential contact surface 17a. The two discs 16, 17 nip the overlapping longitudinal margins 2a of the film 2 at a position slightly deviating toward the cutter disc 16 from the center line C of the longitudinal outlet 15 as illustrated in FIG. 2. An acceptable degree of such deviation is 0.5–2 mm. One or both of the discs 16, 17 are rotated by a drive mechanism (not shown). Both of the discs 16, 17 are heated by their respective heaters (not shown) embedded therein.

A longitudinal guide plate 18 is disposed immediately under the point of contact between the two discs 16, 17. Since the guide plate 18 deviates slightly from the center line C toward the cutter disc 16, the overlapping longitudinal margins 2a of the film 2, which initially hang down substantially straight along the center line C, is guided by the side of the guide plate 18 facing the counter disc 17, as apparent from FIG. 2. Thus, upon entry between the two discs 16, 17, respective upper portions of the overlapping film longitudinal margins 2a are bent away from the center line C by the discs 16, 17, while respective lower portions of the overlapping longitudinal margins 2a are directed toward the center line C by the guide plate 18. As a result, the overlapping longitudinal margins 2a of the film 2 are kept in tension at the longitudinal sealer 12.

Alternatively, the guide plate 18 may be positioned intermediate the center line C of the longitudinal outlet 15 and the contact point of the two discs 16, 17. Further, the guide plate 18 may be replaced by a plurality of guide rollers (not shown) spaced apart longitudinally of the film 2.

Further alternatively, the guide plate 18 may be replaced by a pair of nipping rollers (not shown) which nip and direct the lower portions of the overlapping film margins 2a toward the center line C of the longitudinal outlet 15. In case such nipping rollers are employed, the overlapping film margins 2a may project out upward because the nipping rollers have a film retaining function in addition to a film guiding function.

Referring again to FIG. 1, the tubed film 2 obtained at the tube former 1 is continuously taken out together with the inside articles 6 by a pair of belt conveyors 19 which are arranged behind the tube former 1 respectively above and below a path of the tubed film 2. Further behind the belt conveyors 19 is provided a transverse sealer 20.

Figure 3:
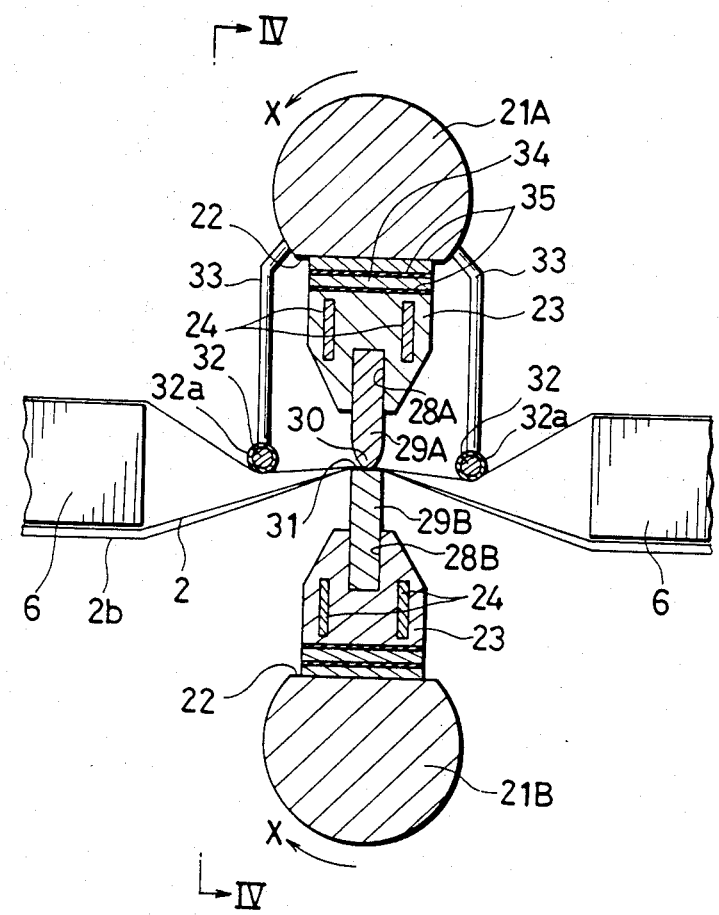
FIG. 3 is an enlarged side view, in section, showing a transverse sealer in an instant state for transverse heat-sealing.

As illustrated in FIGS. 3 and 4, the transverse sealer 20 comprises a pair of rotary shafts 21A, 21B located respectively above and below the path of the tubed film 2 and extending transversely thereof. Both of the rotary shafts are rotated synchronously by a drive mechanism (not shown). Each of the rotary shafts has a flat support surface 22 on which is mounted a sealer body 23 incorporating a pair of embedded heaters 24.

Each of the sealer bodies 23 has a pair of mounting flanges 25 each formed with a through-hole 26 into which is inserted a bolt 27 having a threaded shank 27a for screwing into the corresponding rotary shaft as best shown in FIG. 4. The diameter of the through-hole 26 is slightly larger than that of the bolt shank 27a, so that the sealer body 23 is slightly adjustable in position relative to the flat shaft support surface 22 prior to complete tightening of the bolt 27.

The sealer body 23 above the film 2 is formed with an anchoring groove 28A (FIG. 3) which receives a cutter blade 29A having a rounded cutter edge 30. The sealer body 23 below the film 2 is similarly formed with an anchoring groove 28B which receives a counter blade 29A having a flat contact surface 31. When the respective rotary shafts 21A, 21B are rotated in the directions of arrows X to the positions shown in FIG. 3, the cutter blade 29A comes substantially into line contact with the counter blade 29B with the film tube 2 interposed therebetween.

A pair of presser rods 32 extending in parallel to the rotary shafts 21A, 21B are provided above the tubed film 2 respectively ahead of and behind the cutter blade 29A. Each of the presser rods 32 is mounted to the rotary shaft 21A above the film 2 by means of a pair of bent arms 33 downwardly extending from the shafts 21A (see also FIG. 4).

Preferably, each of the presser rods 32 is coated with a heat-resistant lining 32a as shown in FIG. 3.

Further, each of the sealer bodies 23 should preferably incorporate a ceramic layer 34 welded to the remainder of the sealer body (made of e.g. a ferrous metal) by means of intervening metallic layers (e.g. copper layers) 35 on both sides of the ceramic layer 34. Such ceramic layer 34 serves to prevent the heat of the heaters 24 from being transmitted to the corresponding rotary shaft 21A (21B), thereby protecting bearings (not shown) supporting the rotary shaft.

Indicated at 36 are a pair of discharge belt conveyors for transferring each provisionally packaged article 6 to an unillustrated heating station.

In operation, the blank continuous film 2 paid out from the roll 3 (FIG. 1) is minutely perforated by the perforating roller 5 as hereinbefore described and supplied to the tube former 11 where it is formed into a tubular shape (FIG. 2) to surround each of the articles 6 successively fed by the belt conveyor 7. The overlapping longitudinal margins 2a of the film 2 hanging down through the longitudinal outlet 15 is guided by the longitudinal guide plate 18 and brought into tension upon entry between the two discs 16, 17. In this condition, the overlapping film longitudinal margins 2a are heat-sealed at the point of contact between the two discs 16, 17 and, at the same time, cut by the rounded circumferential edge 16a of the cutter disc 16 under the influence of the tension acting on the longitudinal margins 2a.

Residual portions of the film overlapping margins 2a which have been cut away are indicated at 2a' in FIG. 2B. Indicated at 2b in FIG. 1 is a narrow longitudinal seal line formed by heat-sealing.

The counter disc 17 is heated to a temperature lower than the melting point of the film 2 in order to avoid melting of the overlapping film margins 2a at unexpected portions thereof. On the other hand, the cutter disc 16 must be heated to a temperature which is higher than the melting point of film 2 so as to conduct intended heat-sealing and thermal cutting at the rounded cutting edge 16a.

The counter disc 17 may not have a self-heating function. In this case, however, the counter disc 17 which is always in contact with the heated cutter disc 16 is progressively heated to a higher temperature as the operation proceeds, so that it becomes difficult to ensure a uniform heat-sealing of the overlapping film margins 2a though still acceptable. Thus, the counter disc 17 should preferably have a self-heating function as in the illustrated example because the counter disc 17 can be always maintained at a constant temperature by controlled heating thereof.

The film tube 2 continuously formed by the tube former 11 is transferred by the belt conveyors 19 to the transverse sealer 20 where the tube 2 is transversely heat-sealed and cut at a position between each adjacent two of the articles 6 inside More particularly, when the cutter blade 29A rotating with the upper rotary shaft 21A approaches the counter blade 29B rotating with the lower rotary shaft 21B, one (front one) of the presser rods 32 presses down the top side of the film tube 2 as shown in FIG. 5. In this position, the cutter blade 29A, which is heated to a temperature higher than the melting point of the film 2, is prevented from coming into premature contact with the top side of the film tube 2 to avoid unexpected melting thereof. It is to be noted that the counter blade 29B, which comes into direct contact with the bottom side of the film tube 2, is heated to a temperature lower than the melting point of the film 2 so as not to cause unexpected melting of the film 2.

When the cutter blade 29A comes into contact with the counter blade 29B with the film tube 2 interposed therebetween as shown in FIG. 3, the top side of the film tube 2 is pressed downward into tension by both of the presser rods 32, while the bottom side of the film tube 2 is also rendered taut by being pressed upward by the counter blade 29B. Thus, as soon as the film tube 2 is transversely heat-sealed by the cutting edge 30 of the cutter blade 29A, a portion of the continuous film tube 2 enclosing a leading one of the articles 6 is cut off from the remainder of the film tube 2 as clearly illustrated in FIG. 6. It should be noted that the other (rear one) of the presser rods 32 serves to prevent the cutter blade 29A from coming into contact with the remainder of the film tube 2 immediately after the transverse cutting.

Figure 7:
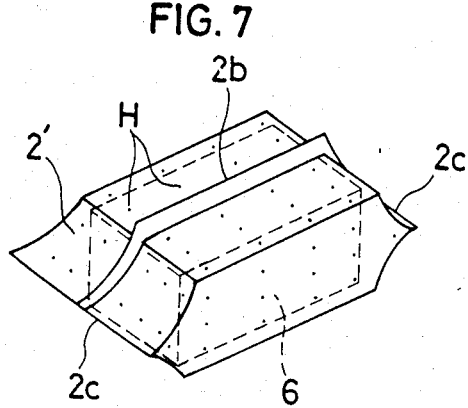
FIG. 7 is a perspective view showing a film bag prior to thermal shrinkage.

Each narrow transverse seal line formed as a result of the transverse heat-sealing is indicated at 2c in FIGS. 6 and 7. On the other hand, reference numeral 2' represents a film bag completely enclosing the leading article 6.

Figure 8:
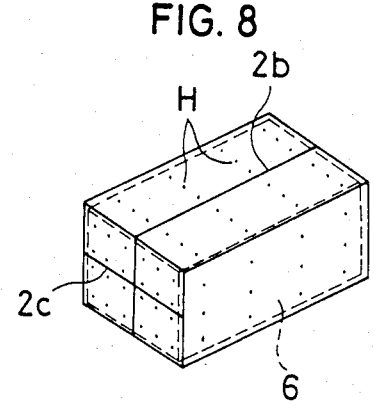
FIG. 8 is a perspective view showing a final packaged product.

The film bag 2' thus obtained is transferred by the belt conveyor 36 to the unillustrated heating station in which it is subject to known hot air treatment for example. Because the bag 2' is formed with the multiplicity of pores H as previously described, air trapped within the bag 2' is allowed to escape through the pores H. Thus, upon such hot air treatment, the bag 2' thermally shrinks into close contact with the article 6 inside to provide a final product package as illustrated in FIG. 8. Since the longitudinal and transverse seal lines 2b, 2c are very narrow and thus negligible in appearance, the product package is extremely high in commercial value.

As previously described, the position of each sealer body 23 is adjustable on the flat support surface 22 of a corresponding rotary shaft 21A (21B) because of a slight difference in diameter between each through-hole 26 of the sealer body 23 and the shank 27a of a corresponding bolt 27.

Figure 9:
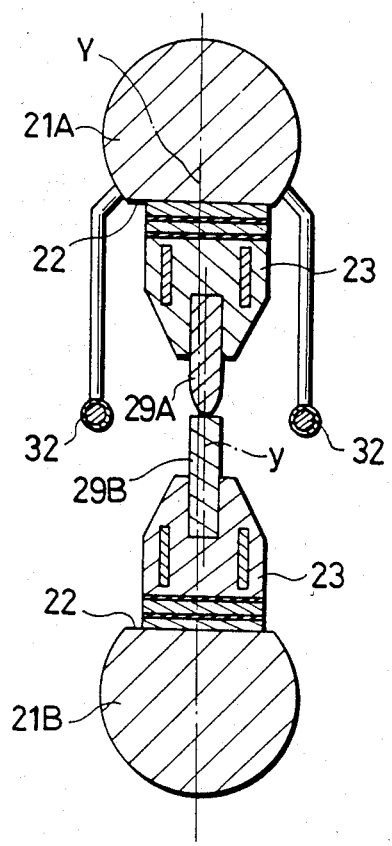
FIG. 9 is a view similar to FIG. 3 showing the manner of positional adjustment of the transverse sealer.

FIG. 9 illustrates how the sealer bodies 23 are adjusted relative to a common shaft center line Y of the respective rotary shafts 21A, 21B.

More specifically, one of the sealer bodies 23 is first adjusted on its corresponding flat support surface 22 so that its associated blade 29B (29A) comes in alignment with the common shaft center line Y of the rotary shafts 21A, 21B. Then, the other sealer body 23 is moved on its corresponding flat support surface 22 so that its associated blade 29A (29B) comes in alignment with the other blade 29B (29A) to provide a common sealer center line y.

The above adjustment, however, sometimes results in that the common sealer center line y deviates slightly from the common shaft center line Y because it is difficult to bring the associated blade 29B (29A) of the firstly adjusted sealer body 23 into accurate alignment with the common shaft center line Y. In fact, such deviation between the two common center lines Y, y can pose a serious problem in smooth rotation of the rotary shafts 21A, 21B.

Figure 10:
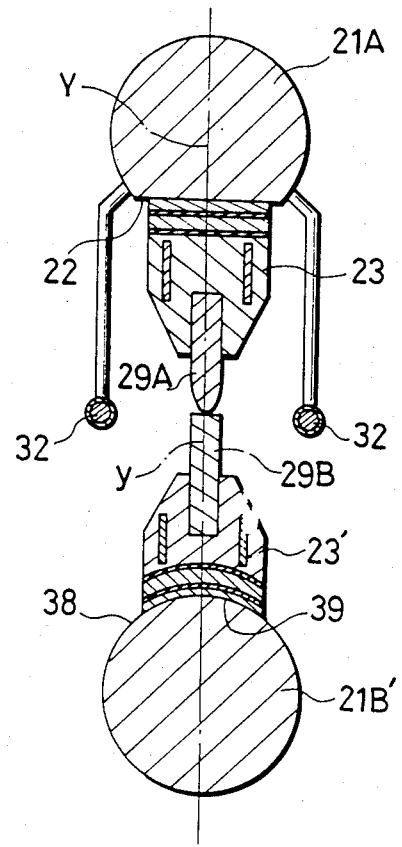
FIG. 10 is also a view similar to FIG. 3 but showing a modified transverse sealer.

In a modification shown in FIG. 10, one rotary shaft 21B' provides a cylindrical support surface 38 on which is mounted a sealer body 23' having a complementary arcuate bottom surface 39.

According to this modification, the blade 29B associated with the modified rotary shaft 21B' is always directed exactly to the center of the shaft 21B' regardless of how the associated sealer body 23' is adjusted on the cylindrical support surface 38. Thus, by adjusting the other sealer body 23 on its associated flat support surface 22 to bring the associated blade 29A into alignment with the counterpart blade 29B, the common center line y of the two blades 29A, 29B exactly coincides with the common center line Y of the rotary shafts 21A, 21B.

The invention being thus described, it will be obvious that the same may be varied in many ways. For instance, each of the rotary shafts 21A, 21B may have a cylindrical support surface which is similar to the one indicated at 38 in FIG. 10. Further, each of the presser rods 32 may be mounted to a corresponding rotary shaft by any support means other than the illustrated bent arms 33, provided that the presser rod 32 is spaced from the sealer body 23 at least by such a minimum distance as to prevent the rod 32 from being unduly heated by the heat emitted from the sealer body 23. Such variations are not to be regarded as departure from the spirit and scope of the invention, and all such modifications as would be obvious to those skilled in the art are intended to be included within the scope of the following claims.

I claim:

1. A film packaging apparatus comprising:
   a tube former to which is supplied a continuous length of a heat-meltable, heat-shrinkable film having a pair of longitudinal margins and to which is also supplied a plurality of articles to be packaged;
   said former including an inner former member on which said film is wrapped with said margins overlapping each other;
   said former further including an outer former member having a longitudinal outlet through which said overlapping margins project out;
   a longitudinal sealer disposed outside said tube former adjacent to said outlet for longitudinally heat-sealing and cutting said overlapping margins;
   said sealer including a cutter disc having a rounded circumferential edge, and a counter disc having a flat circumferential surface substantially in contact with said circumferential edge;
   said margins being nipped between said cutter disc and said counter disc at a position slightly deviating toward said cutter disc from a center line of said longitudinal outlet;
   a film guide for directing toward said center line portions of said margins located farther from said tube former than said position of nipping; and
   a transverse sealer disposed behind said longitudinal sealer for transversely heat-sealing and cutting a continuous tube of said film at a position between each adjacent two of said articles to provide a bag of said film completely enclosing each of said articles.

2. The packaging apparatus as defined in claim 1, wherein
   said longitudinal outlet is positioned below said inner former member for allowing said overlapping margins to project downward,
   said longitudinal sealer is disposed below said outlet adjacent thereto, and
   said film guide is in the form of a longitudinal guide plate which is located immediately under said position of nipping.

3. The packaging apparatus as defined in claim 1, wherein
   said cutter disc is heated to a temperature higher than the melting point of said film, and
   said counter disc is heated to a temperature lower than the melting point of said film.

4. The packaging apparatus as defined in claim 1, wherein said transverse sealer comprises:
   a pair of synchronously rotated rotary shafts arranged respectively above and below said tube of said film and extending transversely thereof;
   a pair of sealer bodies respectively mounted on said pair of rotary shafts;
   a cutter blade mounted on one of said sealer bodies and and having a rounded cutting edge;
   a counter blade mounted on the other of said sealer bodies and having a flat contact surface for contact with said cutting edge of said cutter blade upon every single turn of said rotary shafts; and
   a pair of presser rods supported by one of said rotary shafts supporting said one of said sealer bodies and arranged respectively ahead of and behind said cutter blade.

5. The packaging apparatus as defined in claim 4, wherein
   said cutter blade is heated to a temperature higher than the melting point of said film, and
   said counter blade is heated to a temperature lower than the melting point of said film.

6. The packaging apparatus as defined in claim 4, wherein
   said sealer body has a base portion incorporating a ceramic layer.

7. The packaging apparatus as defined in claim 4, wherein each of said presser rods is coated with a heat-resistant lining.

8. The packaging apparatus as defined in claim 4, wherein each of said presser rods is mounted to said one of said rotary shafts by a pair of bent arms.

9. The packaging apparatus as defined in claim 1, further comprising:
means for minutely perforating said film before said film is supplied to said tube former.

* * * * *